Oct. 9, 1951          H. W. FURNALD          2,570,540

APPARATUS FOR INCREASING THE TRACTION OF VEHICLE TIRES

Filed Jan. 17, 1950

INVENTOR.
Harry W. Furnald,
BY
Parker, Prochnow & Farmer,
Attorneys.

Patented Oct. 9, 1951

2,570,540

UNITED STATES PATENT OFFICE 2,570,540

APPARATUS FOR INCREASING THE TRACTION OF VEHICLE TIRES

Harry W. Furnald, Buffalo, N. Y.

Application January 17, 1950, Serial No. 139,102

2 Claims. (Cl. 164—99)

This invention relates to improvements in apparatus for use in connection with increasing the traction of vehicle tires by the roughening of treads of the tires for the purpose of enabling them to better resist slipping, skidding and the like.

Apparatus of this type generally comprises one or more rollers having a large number of prongs or projections on the surface which penetrate to a limited extent the tread of a tire when resting upon the rollers and rotated. These projections form a series of apertures which extend a short distance into the tread surface and which act in a manner similar to suction cups to hold the tire against slipping or skidding.

One of the objects of this invention is to provide an improved roller construction for use in connection with devices of this type, which construction produces an improved simplified and efficient roller for a tire roughening device.

Other objects and advantages will be apparent from the following description of one embodiment of the invention and the novel features will be particularly pointed out hereinafter in connection with the appended claims.

Figure 1:
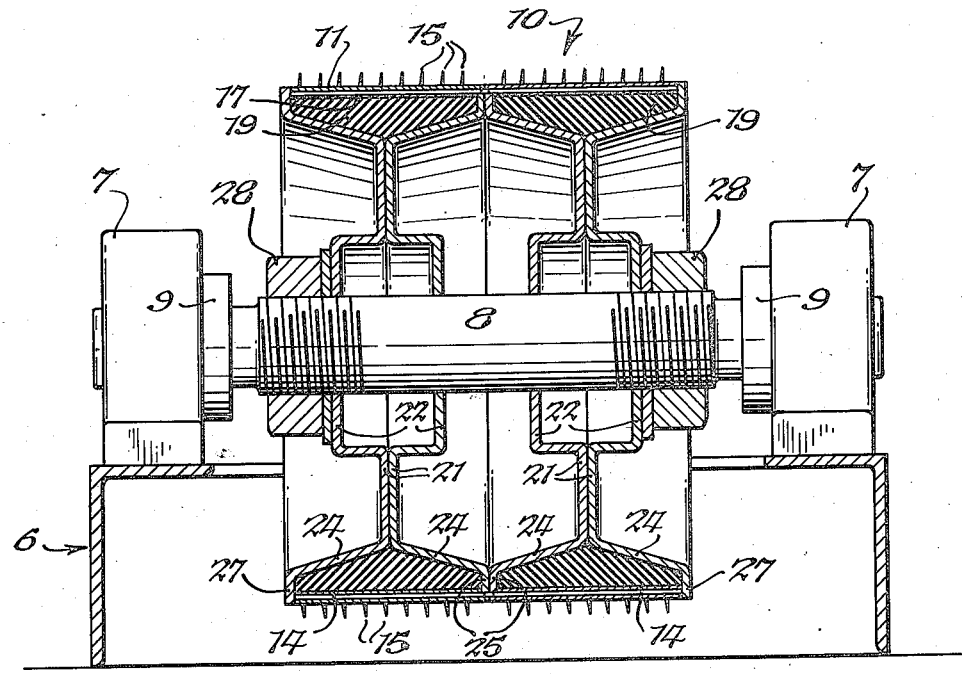
Fig. 1 is a transverse sectional elevation of a tire roughening device provided with a roller embodying this invention.

6 represents a base of any suitable or desired construction for supporting a pair of rollers, and 7 represents bearing of any suitable or desired construction mounted on or formed integral with the base 6. Axles 8 for the rollers are journalled in the bearings 7 and held against endwise movement relatively to the bearings in any suitable manner, for example, by means of flanges or annular members 9 secured to the shaft 8. The rollers are generally designated by the reference character 10 and preferably two of these rollers are provided on which a tire may rest while the tread thereof is being roughened, although if desired, one of the rollers may be a plain-surfaced roller without prongs or projections thereon.

Figure 2:
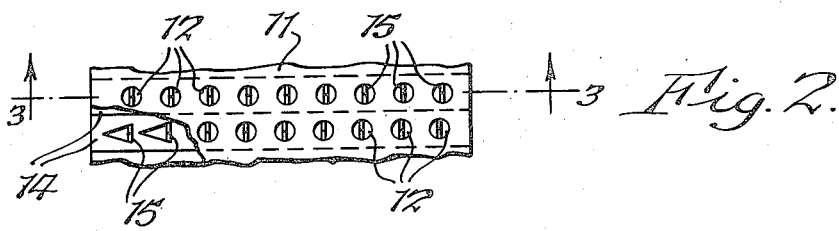
Fig. 2 is a fragmentary view showing a portion of the peripheral surface of the roller.
Figure 3:
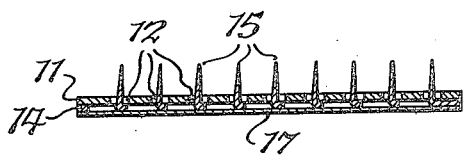
Fig. 3 is a fragmentary sectional view thereof, on line 3—3, Fig. 2.

Each of the rollers embodying this invention includes a pair of units or wheels arranged side by side and each wheel includes a peripheral shell 11 in the form of a cylinder which is provided with a large number of perforations 12, see particularly Figs. 2 and 3. These perforations are preferably arranged in rows extending lengthwise of the shells 11.

The tire tread perforating devices are preferably in the form of strips or cleats 14 of metal having prongs or projections 15 formed integral with the strips. This is preferably done by punching out two sides of the projections from the strips 14 as shown in Figs. 2 and 3 and bending the prongs to substantially a right angle to one of the faces of the strips. These strips or cleats may be made of suitably hardened steel or other material. In the manufacture of rollers embodying my invention, the prongs or projections 15 are spaced apart to the same distances as the perforations 12 in the shells 11 so that when a strip is positioned within the shell all of the prongs or projections of the strip may pass through the holes or perforations 12 of one lengthwise row.

In order to hold the cleats or strips in place on the shell with their projections 15 extending out through the perforations 12, a spring band 17 is provided in the interior of the shell 11. This spring band is preferably in the form of a flat strip of resilient steel or other material which may be bent into approximately cylindrical form and inserted into the interior of the shell 11, and which will, consequently, because of its spring action tend to yieldingly press against the inner faces of all of the cleats or strips 14 and thus press the same against the inner face of the shell 11.

In order to hold the spring bands 17 in their operative positions, a ring 19 of flexible rubber or rubber-like material is provided which is of such outer diameter that when inserted within a shell in engagement with a spring band, the rubber ring will resiliently press against the spring band 17. Since the rubber is of a flexible nature, it may readily be collapsed or folded out of its annular form and then inserted into a shell. When released the rubber band will assume its annular form and yieldingly bear against the spring band 17 and thus form a resilient backing for the spring band.

The parts of the roller thus far described form a periphery therefor and are mounted on wheels secured to the axle 8. Each of these wheels is formed of a pair of disks preferably made of sheet metal formed to provide a web portion 21 terminating at its inner portion in an outwardly and then radially extending hub portion 22, the inner periphery of which is formed to receive the axle 8. At the outer edges the webs 21 are provided with peripheral or rim portions 24 which extend outwardly into contact with the inner surface of the rubber ring 19. The two disks of a wheel are arranged with their web portions 21 in engagement or in close proximity to each other, so that each peripheral portion 24 engages approximately one-half of the inner surface of the rubber ring 19. The peripheral or rim portions 24 of the disks are provided with radially outwardly extending flanges formed to extend along the sides of the rubber rings 19.

Each roller comprises a pair of wheels arranged side by side lengthwise of the axle 8, as clearly shown in Fig. 1. The adjacent disks of the two wheels are provided with radially outwardly extending flanges 25 and the outer two disks of the wheels are provided with radially extending flanges 27 which extend outwardly from the axis of the roller to a greater extent than the flanges 25 of the inner disks. By means of this construction the two shells 11 are held by the disks in end to end relation with their adjacent edges abutting against each other and the flanges 27 extend outwardly in such a manner as to engage the outer edges of the two shells 11. The flanges 27, consequently, serve the purpose of not only holding the disks in end to end contact relation to each other, but also engage the edges and prevent endwise movement of the cleats 14, of the spring bands 17 and of the rubber rings 19. When these disks are arranged with relation to the peripheral portions of the rollers as described, they may be mounted on the axle 8 and secured against endwise movement thereon by means of nuts 28 or the like.

The shorter flanges 25 of the disks form supports for the shells, thus reinforcing the middle portions of the rollers to prevent deflection of the middle portions when the weight of a tire rests thereon, and thus ensures the proper entry of the prongs into all parts of the tread of a tire.

Figure 4:
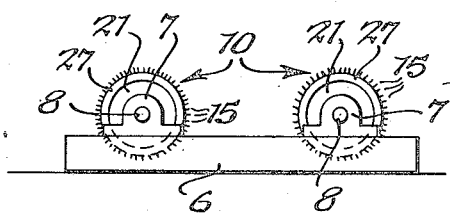
Fig. 4 is a side elevation, on a reduced scale, of the apparatus in connection with which my improved rollers may be used.

In the use of the device shown in Fig. 4 equipped with one or two rollers of the kind described, the vehicle whose tires are to be roughened is positioned with one of its rear wheels resting on the two rollers 10 and with the other rear wheel held against rotation. The engine of the vehicle is then used to rotate that rear wheel which rests on the rollers, thus causing the projections 15 to enter the tread and roughen the same and produce cavities therein which act as suction cups when the vehicle is driven on a slippery surface. After one rear tire has been treated, the device is positioned under the other rear wheel. When it is desired to roughen the front wheels, the front wheels are mounted on the rear of the vehicle and the wheels which have been treated are mounted on the front axles, whereupon the operation described is repeated.

The construction described has the advantage that the shells, cleats, spring bands and rubber rings of the roller are very securely held in place relatively to each other by means of the flanges 27, and since these flanges are formed integral with the outer disks of the rollers, there is practically no chance of endwise displacement of any of the parts of the rollers. If the cleats 14 become worn or dulled so that they have to be replaced, it is only necessary to remove the outer disks of the rollers, whereupon the rubber rings and the parts arranged beyond the peripheries thereof can be readily removed from the roller. For this purpose, the peripheral flanges 24 of the disks preferably diverge outwardly from the web portions 21. Consequently, the rubber rings and the disks can be readily moved out of engagement with each other.

By reinforcing the middle portions of the rollers by means of the shorter flanges 25, these middle portions are securely held in place when a part of the weight of a vehicle is supported on the rollers, so that uniform entry of the prongs into the tread portions of tires results.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. In a device for increasing the traction of vehicle tires, a roller for rolling contact with a tire, including a pair of cylindrical peripheral shells arranged end to end in alinement with each other and provided with perforations arranged in rows extending crosswise of the shells, a plurality of cleats comprising metal plates having pointed projections extending substantially perpendicular to a face thereof and arranged within each of said shells with their projections extending through said perforations, a spring band within each of said shells for holding said cleats in their operative relations to the shells, a rubber ring for each shell and arranged within said spring band and pressing the spring band toward the inner faces of said cleats, a pair of annular disks for each cylindrical shell, said disks having rim portions engaging said rubber ring and being slidable endwise of said shells from opposite ends thereof into engagement with said rubber ring, the rim portions of the outer disk of each pair having a radially outwardly extending flange, the outer edge of which extends into engagement with the outer edge of a shell, to confine said shell, cleats, spring band and rubber ring against endwise displacement relatively to the roller, the flanges of the rim portions of the inner disks of each pair being of lesser diameter than the flanges of said outer disks and supporting the adjacent ends of said shells against radial deflection and a rotatably mounted axle to which said disks are secured against endwise displacement relatively to each other.

2. In a device for increasing the traction of vehicle tires, a roller for rolling contact with a tire, including a pair of cylindrical peripheral shells arranged end to end in alinement with each other and provided with perforations arranged in rows extending crosswise of the shells, a plurality of cleats comprising metal plates having pointed projections extending substantially perpendicular to a face thereof and arranged within each of said shells with their projections extending through said perforations, a spring band within each of said shells for holding said cleats in their operative relations to the shells, a rubber ring for each shell and arranged within said spring band and pressing the spring band toward the inner faces of said cleats, two pairs of annular disks, one pair for each shell, said disks each having web portions arranged with the web portions of each pair of disks in proximity to each other, said disks having rim portions formed to engage said rubber rings and flaring outwardly from said web portions, said rim portions terminating in radially extending flanges, the flanges of the outer disks of each pair extending outwardly into engagement with the outer ends of said shells, and said flanges of said inner disks being of less diameter than the flanges of said outer disks and terminating within said shells in positions to support the adjacent ends of said shells against radially inward deflection when a vehicle tire rests on said roller, and a rotatably mounted axle to which said disks are secured against endwise displacement with the inner disks of two shells facing each other and with the outer disks forming the ends of said roller.

HARRY W. FURNALD.

REFERENCES CITED

The following references are of record in the file of this patent:

UNITED STATES PATENTS

| Number | Name | Date |
| --- | --- | --- |
| 2,140,831 | Ecklund et al. | Dec. 20, 1938 |
| 2,416,203 | Nielsen | Feb. 18, 1947 |
| 2,504,090 | Sanderson | Apr. 11, 1950 |